United States Patent
Heo et al.

(10) Patent No.: US 9,927,865 B2
(45) Date of Patent: Mar. 27, 2018

(54) METHOD FOR DISPLAYING IMAGE INFORMATION AND ELECTRONIC DEVICE THEREOF

(71) Applicant: Samsung Electronics Co., Ltd., Gyeonggi-do (KR)

(72) Inventors: Chang-Ryong Heo, Gyeonggi-do (KR); Ken-Hyung Park, Gyeonggi-do (KR); Hyun-Seok Shin, Gyeonggi-do (KR); Kyung-Hee Lee, Gyeonggi-do (KR); Chi-Hyun Cho, Gyeonggi-do (KR); Oh-Yong Kwon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/616,418

(22) Filed: Feb. 6, 2015

(65) Prior Publication Data

US 2015/0228048 A1 Aug. 13, 2015

(30) Foreign Application Priority Data

Feb. 7, 2014 (KR) .................. 10-2014-0014473

(51) Int. Cl.
G09G 5/00 (2006.01)
G06F 1/32 (2006.01)

(52) U.S. Cl.
CPC ............ G06F 1/3293 (2013.01); G06F 1/329 (2013.01); G06F 1/3265 (2013.01); *Y02B 60/121* (2013.01); *Y02B 60/1242* (2013.01); *Y02B 60/144* (2013.01); *Y02B 60/32* (2013.01)

(58) Field of Classification Search
CPC ....... G09G 2330/021; G09G 2330/022; G09G 2310/0213; G09G 5/363; G06F 1/1616; G06F 1/326
See application file for complete search history.

(56) References Cited

U.S. PATENT DOCUMENTS

| 3,950,077 A | 4/1976 | Jasinski | |
| 8,560,753 B1* | 10/2013 | Hobbs | .................. G06F 3/1454 345/2.1 |
| 2001/0040536 A1 | 11/2001 | Tajima et al. | |
| 2003/0222866 A1* | 12/2003 | Funston | ................ G06F 1/3228 345/211 |
| 2007/0285428 A1* | 12/2007 | Foster | ....................... G06F 3/14 345/503 |
| 2008/0106531 A1* | 5/2008 | Hullot | ............... H04M 1/72544 345/204 |

* cited by examiner

Primary Examiner — Hau Nguyen

(57) ABSTRACT

An apparatus and method for are configured to display image information in an electronic device. The method for displaying image information includes: deactivating a processor when the electronic device operates in a low-power mode; activating the processor to generate image data when an activation period is reached; displaying image information corresponding to the image data on a display unit; and deactivating the processor. Various other embodiments are also possible.

20 Claims, 22 Drawing Sheets

METHOD FOR DISPLAYING IMAGE INFORMATION AND ELECTRONIC DEVICE THEREOF

PRIORITY

The present application is related to and claims priority under 35 U.S.C. § 119 to an application filed in the Korean Intellectual Property Office on Feb. 7, 2014 and assigned Serial No. 10-2014-0014473, the contents of which are incorporated herein by reference.

TECHNICAL FIELD

Various embodiments of the present disclosure relate to an apparatus and method for displaying image information in an electronic device.

BACKGROUND

With the development of information communication technology and semiconductor technology, various types of electronic devices have been advanced into devices for providing various multimedia services, and therefore, include a display for displaying image information. For example, a display can include a panel configured in an array of pixels, such as a liquid crystal display (LCD) panel, a plasma display panel (PDP), or an organic light emitting diode (OLED) panel, and a chip-type display driver IC (DDI) configured to operate to drive the pixels.

The display of the electronic device displays image information by controlling transistors of the pixels by referring to image information in a frame unit provided from a processor.

In order to display image information through a display in an electronic device, it is necessary to activate a processor for generating the image information. Accordingly, when the processor switches to a low-power mode (for example, a sleep mode) and is deactivated in order to reduce power consumption, the electronic device is not able to display the image information through the display.

SUMMARY

To address the above-discussed deficiencies, it is a primary object to provide an apparatus and method for displaying image information when an electronic device operates in a low-power mode.

Various embodiments of the present disclosure provide an apparatus and method for reducing power consumption upon display of image information in an electronic device.

According to an aspect of the present disclosure, a method for displaying image information in an electronic device includes: deactivating a processor when the electronic device operates in a low-power mode; activating the processor to generate image data when an activation period is reached; displaying image information corresponding to the image data on a display unit; and deactivating the processor.

According to another aspect of the present disclosure, a method for displaying image information in an electronic device includes: deactivating a main processor and activating a sub processor when the electronic device operates in a low-power mode; generating, by the sub processor, image data when an activation period is reached; and displaying image information corresponding to the image data on a display unit.

According to another aspect of the present disclosure, an electronic device includes: a display; and a processor, wherein the processor is deactivated when the electronic device operates in a low-power mode, and when an activation period is reached, is activated to generate image data and transmit the image data to the display to allow a display unit to display the image data, and the processor is deactivated after transmission of the image data to the display.

According to another aspect of the present disclosure, an electronic device includes: a display; a main processor; and a sub-processor, wherein the main processor is deactivated when the electronic device operates in a low-power mode, and the sub-processor is activated by the main processor in a case in which the electronic device operates in a low-power mode, and when an activation period is reached, generates image data, transmits the image data to the display to allow a display unit to display the image data.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various embodiments of the present disclosure will be described below in detail with reference to the accompanying drawings. In the following description, detailed descriptions of well-known functions or configurations will be omitted since they would unnecessarily obscure the subject matters of the present disclosure. Furthermore, terms to be described below have been defined by considering functions in embodiments of the present disclosure, and may be defined differently depending on a user or operator's intention or practice. Therefore, the definitions of such terms are based on the descriptions of the entire present specification.

Various embodiments of the present disclosure provide an apparatus and method for displaying image information in an electronic device.

Examples of the electronic device according to various embodiments of the present disclosure include one or more of a smart phone, a tablet personal computer (PC), a mobile phone, a video phone, an electronic-book reader, a desktop PC, a laptop PC, a netbook computer, a Personal Digital Assistant (PDA), a portable multimedia player (PMP), an MP3 player, an accessory, an appcessory, a camera, a wearable device, a wrist watch, a refrigerator, an air-conditioner, a cleaner, an intelligent robot, a television, a digital video disk (DVD) player, a stereo, an oven, a microwave oven, a washing machine, an electronic bangle, an electronic necklace, an air cleaner, and a digital photo frame, a medical equipment, a navigation device, a satellite signal receiver, an event data recorder (EDR), a flight data recorder (FDR), a set-top box, a TV box, an electronic dictionary, a vehicle infotainment device, an electronic equipment for ship, an avionics device, a security equipment, an electronic clothing, an electronic key, a camcorder, a game console, a head-mounted display (HMD) a flat panel display device, an electronic album, a furniture or a portion of a building/structure including an electronic device, an electronic board, an electronic signature receiving device, and a protector. It is apparent that the electronic device according to various embodiments of the present disclosure is not limited to the above-described devices.

There will be a description for a technology of continuously displaying brief information, such as time information and information on a battery remaining capacity, when operating in a low-power mode in order to reduce power consumption. The low-power mode includes one or more of a screensaver mode, a sleep mode, and a lock mode.

Figure 1:
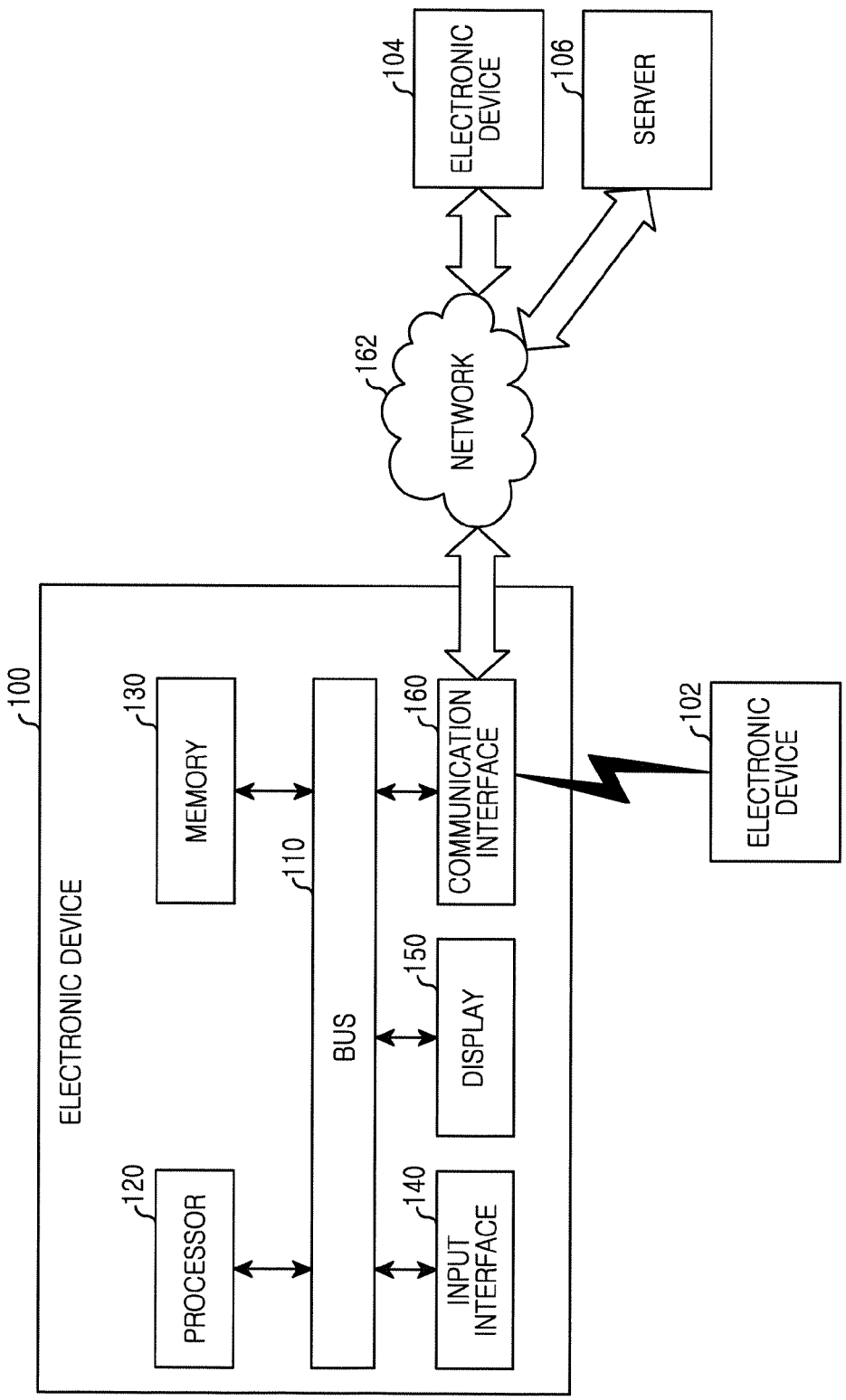
FIG. 1 illustrates a block diagram of an electronic device according to various embodiments of the present disclosure.
Figure 2:
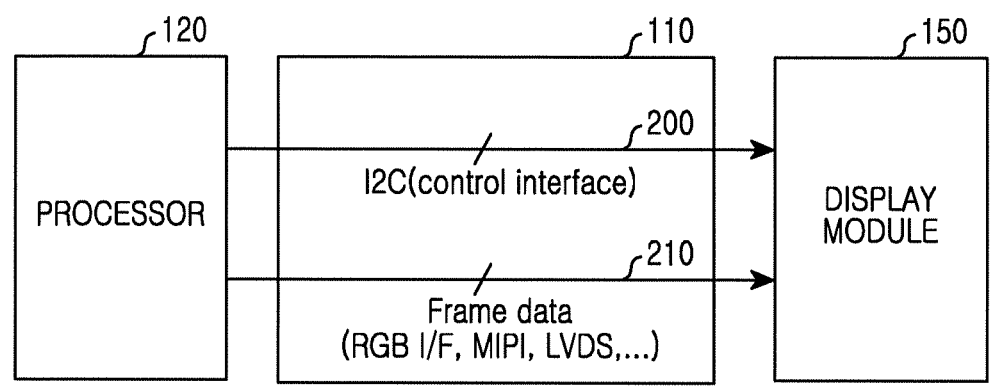
FIG. 2 is a block diagram illustrating connections between internal modules of an electronic device according to various embodiments of the present disclosure.

FIG. 1 illustrates an electronic device according to various embodiments of the present disclosure. FIG. 2 illustrates connections between internal modules in an electronic device.

The electronic device 100 includes a bus 110, a processor 120, a memory 130, an input interface 140, a display 150, and a communication interface 160. One or more of the processor 120 and the memory 130 can be provided by a plurality of processors 120 and memories 130.

The bus 110 connects elements included in the electronic device 100 to one another, and transmits information (e.g., a control message) transmitted and received between the elements included in the electronic device 100. For example, as illustrated in FIG. 2, the bus 110 includes a control interface 200 that transmits a control signal (control data) generated by the processor to the display 150. The bus 110 includes a data interface 210 that transmits image data (or pixel data) generated by the processor 120 to the display 150. The control interface includes one or more of an inter integrated circuit (I2C), a serial peripheral interface (SPI) and a general purpose input/output (GPIO), and the data interface includes one or more of an mobile industry processor interface (MIPI), a central processing unit (CPU) interface, an RGB (Red, Green, Blue) interface, and a low voltage differential signaling (LVDS) interface.

The processor 120 performs control such that the electronic device 100 provides various services. For example, the processor 120 decodes a command received from one or more other elements (for example, the memory 130, the input interface 140, the display 150, and the communication interface 160) included in the electronic device 100 through the bus 110, and perform arithmetic operations or data processing according to the decoded command.

The processor 120 processes image data to be displayed through the display 150. For example, the processor 120 generates image data to be displayed through the display 150 and a control signal for allowing the image data to be displayed, and transmits the image data and the control signal to the display 150. For example, when the electronic device 100 operates in a low-power mode, the processor 120 is deactivated based on the low-power mode of the electronic device 100. The processor 120 is activated at an image transmission time point at which an image is to be transmitted. In this case, the processor 120 generates image data for one or more of time information and information on a battery remaining capacity, which is to be displayed through the display 150, and transmits the image data to the display 150. For example, the image transmission time point includes a time point at which the processor 120 displays image information on a display unit 300 of the display 150 or a time point at which it is necessary to generate image data (for example, a period of one minute in the case of time image information), such as a time point at which image information displayed on the display unit 300 is changed. For example, the processor 120 extracts information on a change area to be changed by second image data to be transmitted to the display 150 from display information which is displayed on the display 150, and transmit the information on the change area to the display 150. For example, the processor 120 compares first image data that is previously transmitted to the display 150 (for example, image data displayed on the display 150) with the second image data and extract information on the change area to be changed by the second image data.

The memory 130 stores an instruction or data received from, or generated by, one or more elements (the processor 120, the input interface 140, the display 150, and the communication interface 160) included in the electronic device 100.

The memory 130 stores one or more programs for services of the electronic device 100. For example, the memory 130 includes one or more of a graphic user interface (GUI) program and a communication control program that are executed by the processor 120 for the services of the electronic device 100.

The input interface 140 detects an instruction or data that is input by the user. For example, the input interface 140 transmits an instruction or data that is input by the user to the processor 120 or the memory 130 through the bus 110. For example, the input interface 140 can include one or more of a keypad including at least one hardware button and a touch panel for detecting touch information.

The display 150 displays a still image, a moving image, or data to the user. For example, as illustrated in FIG. 3, the display 150 includes the display unit 300 configured by a plurality of pixels to display an image and a display driver IC (DDI) configured to control the pixels included in the display unit 300 so as to display image information.

The communication interface 160 communicably connects the electronic device 100 to one or more other electronic devices 102 or 104, a server 106, or one or more peripheral devices. For example, the communication interface 160 can support short-range communication protocols (for example, wireless local area network (WLAN), near-field communication (NFC), radio frequency identification (RFID), infrared data association (IrDA), visual light communication (VLC)), or network communication protocols (for example, Internet, LAN, wire area network (WAN), telecommunication network, cellular network, satellite network or plain old telephone service (POTS)) or wire communication protocols (for example, USB (Universal Serial Bus), HDMI (High Definition Multimedia Interface)). For example, the communication protocol (for example, a short-range communication protocol, a network communication protocol, or a wire line communication protocol) can be supported by the middleware of the memory 130 and an application programming interface (API).

Figure 3:
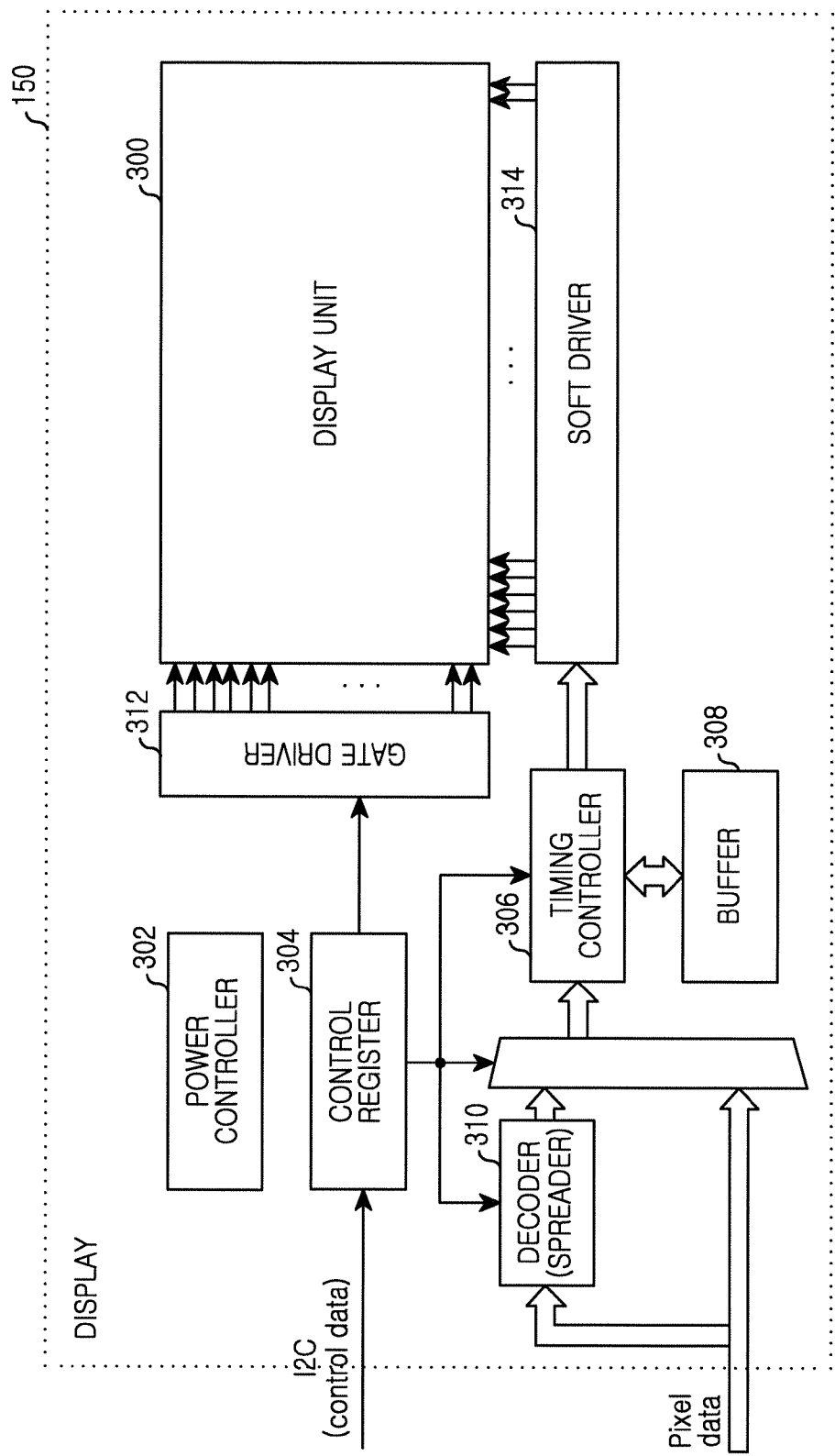
FIG. 3 illustrates a detailed block diagram of a display according to various embodiments of the present disclosure.

FIG. 3 illustrates a detailed block diagram of a display according to various embodiments of the present disclosure.

Referring to FIG. 3, the display 150 includes the display unit 300 configured in such a way that a plurality of pixels are arranged and the display driver IC (DDI) configured to drive the pixels included in the display unit 300.

The DDI includes a power controller 302, a control register 304, a timing controller 306, a buffer 308, a decoder 310, a gate driver 312, and a source driver 314.

The power controller 302 supplies power for driving of the display 150. For example, the power controller 302 can include one or more of a DC-DC converter and a low drop output (LDO).

The control register 304 stores control information provided from an external device (for example, the processor 120).

The timing controller 306 controls a timing at which an image displayed on the display unit 300 is updated based on a reference time interval.

The buffer 308 stores image data for updating of an image displayed on the display unit 300 by the timing controller 306.

The decoder 310 restores encoded or compressed image data provided from the processor 120. For example, when the electronic device 100 operates in a low-power mode, the processor 120 encodes or compresses image data information for a change area and transmits the image data information to the display 150. Therefore, when the electronic device 100 operates in a low-power mode, the decoder 310 decodes or decompresses the encoded or compressed image data provided from the processor 120 and transmits the image data to the timing controller 306.

The gate driver 312 controls whether to activate (turn on/off) respective pixels included in the display unit 300. For example, when the electronic device 100 operates in a low-power mode, the electronic device 100 displays time information and information on a battery remaining capacity in a bi-color scheme. Therefore, when the electronic device 100 operates in a low-power mode, the gate driver 312 activates (turns on) pixels of an area on which, for example, time information and information on a battery remaining capacity are displayed and deactivates (turns off) pixels of a remaining background area, based on image data information provided from the processor 120.

The source driver 314 controls colors of respective pixels included in the display unit 300 based on image data information provided from the processor 120.

Figure 4:
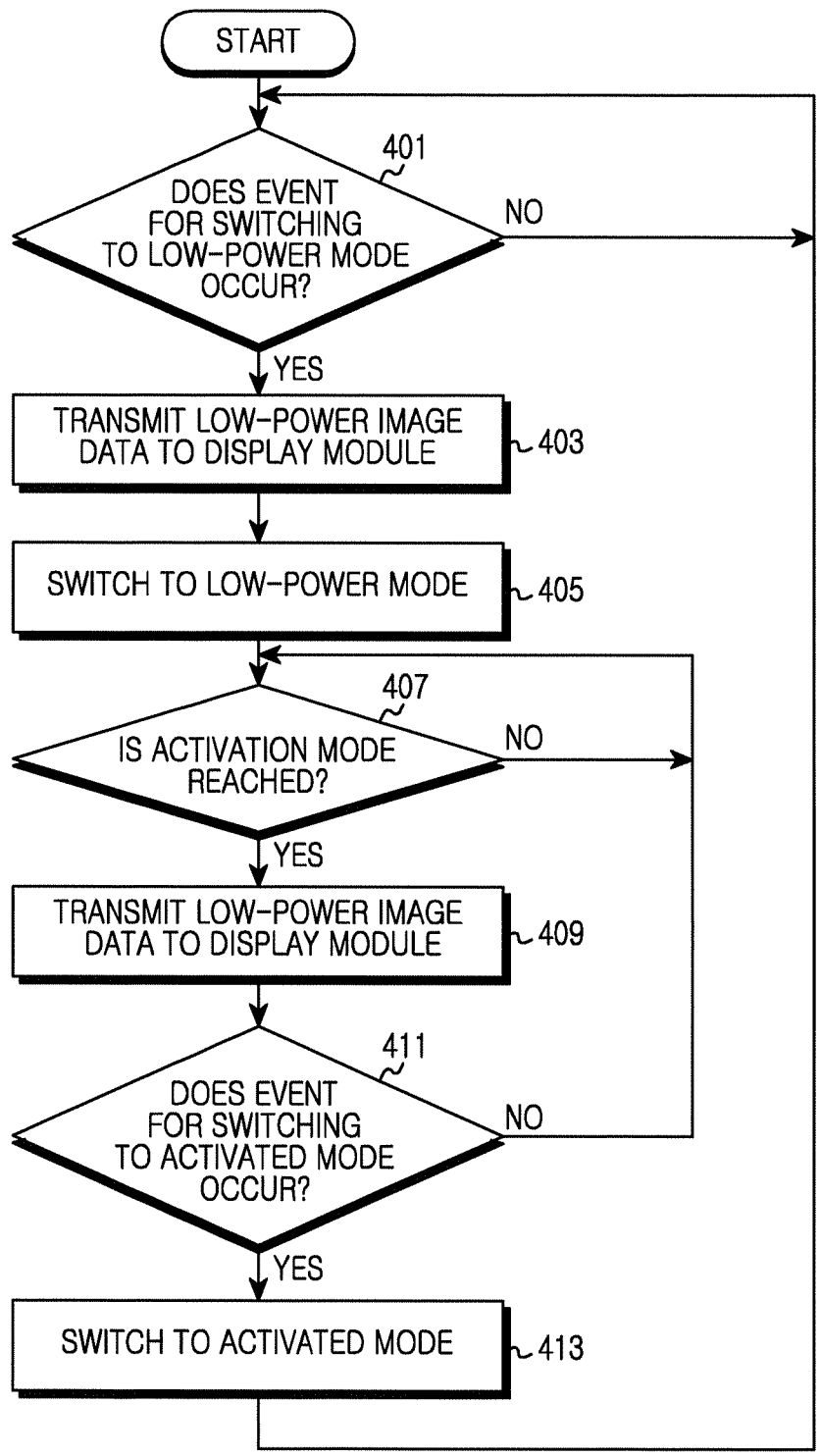
FIG. 4 illustrates a process for transmitting image data to a display in a processor of an electronic device according to various embodiments of the present disclosure.

FIG. 4 illustrates a process for transmitting image data to a display 150 in a processor 120 of an electronic device 100 according to various embodiments of the present disclosure.

In operation 401, the processor 120 determines whether an event for switching to a low-power mode occurs. For example, the processor 120 determines whether a selection of a power button is detected through the input interface 140. In another example, the processor 120 determines whether a reference time has lapsed after detection of an input of a user through the input interface 140.

When the event for switching to the low-power mode does not occur in operation 401, the processor 120 again determines whether the event for switching to the low-power mode occurs in operation 401.

When the event for switching to the low-power mode occurs in operation 401, the processor 120 generates low-power image data and transmits the low-power image data to the display 150 in operation 403. For example, the processor 120 can generate low-power image data including one or more of time information on a time point at which the event for switching to the low-power mode occurs and information on a battery remaining capacity and transmit the low-power image data to the display 150.

In operation 405, the processor 120 is deactivated based on the switching to the low-power mode in the electronic device 100.

In operation 407, the processor 120 determines whether an activation period is reached. The activation period indicates a time point at which time information or battery information is changed. For example, when the processor 120 continuously displays time information while the electronic device 100 operates the low-power mode, the processor 120 determines whether a time update period (for example, second/minute/hour) is reached based on a time display method. In another example, when the processor 120 continuously displays information on a battery remaining capacity while the electronic device 100 operates the low-power mode, the processor 120 determines whether a battery information exchange period is reached In another example, when the processor 120 continuously displays time information and information on a battery remaining capacity while the electronic device 100 operates in the low-power mode, the processor 120 determines whether a time update period (for example, second/minute/hour) is reached based on a time display method.

When the activation period is not reached in operation 407, the processor 120 again determines whether the activation period is reached in operation 407. When an event for switching to an activated mode occurs while the processor 120 determines whether the activation period is reached (not illustrated), the processor 120 switches to the activated mode in operation 413.

When the activation period is reached in operation 407, the processor 120 generates low-power image data for updating of image information displayed on the display unit 300 and transmits the low-power image data to the display 150 in operation 409. For example, when the activation period is reached, the processor 120 is activated. In this case, the processor 120 generates image data for updating of one or more of time information and information on a battery remaining capacity, which are displayed on the display unit 300, and transmits the image data to the display 150. Thereafter, the processor 120 is deactivated.

In operation 411, the processor 120 determines whether an event for switching to the activated mode occurs. For example, the processor 120 determines whether an input from a user is detected through the input interface 140. In another example, the processor 120 determines whether a service provision signal is received through the communication interface 160.

When the event for switching to the activated mode does not occur in operation 411, the processor 120 determines whether the activation period is reached in operation 407.

When the event for switching to the activated mode occurs in operation 411, the processor 120 switches to the activated mode in operation 413.

In the above embodiment, in a case where the electronic device 100 operates in a low-power mode, when the activation period is reached, the processor 120 generates low-power image data for updating of image information displayed on the display unit 300 and transmits the low-power image data to the display 150. In this case, as illustrated in FIG. 5, the processor 120 extracts image data for a partial area where image information is to be changed in image information displayed on the display unit 300 and transmits the image data to the display 150.

Figure 5:
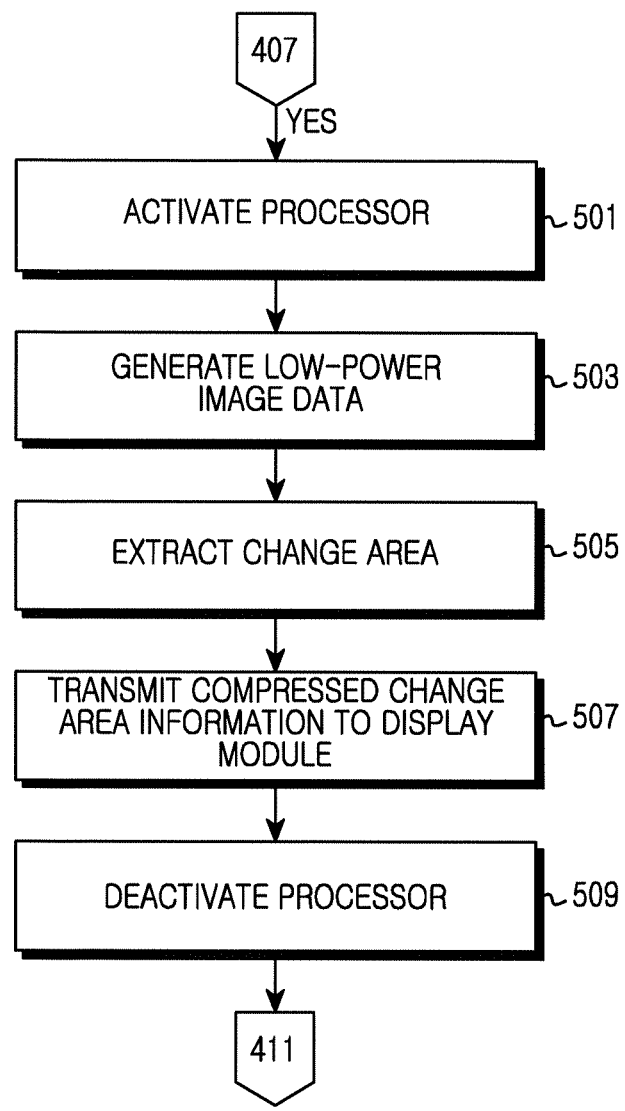
FIG. 5 illustrates a process for generate image data to be transmitted to a display in a processor of an electronic device according to various embodiments of the present disclosure.

FIG. 5 illustrates a process for generating image data to be transmitted to a display 150 in a processor 120 of an electronic device 100 according to various embodiments of the present disclosure. A feature of the present disclosure for extracting a change area will be described with reference to screen configurations illustrated in FIGS. 6A and 6B.

Referring to FIG. 5, when the activation period is reached in operation 407 of FIG. 4, the processor 120 is activated in order for image updating during the low-power mode in operation 501.

In operation 503, the processor 120 generates low-power image data for updating of image information displayed on the display unit 300. For example, the processor 120 generates low-power image data based on time information calculated through a sleep timer (not illustrated). In another example, the processor 120 measures a battery remaining capacity and generates low-power image data representing the measured battery remaining capacity.

Figure 6A:
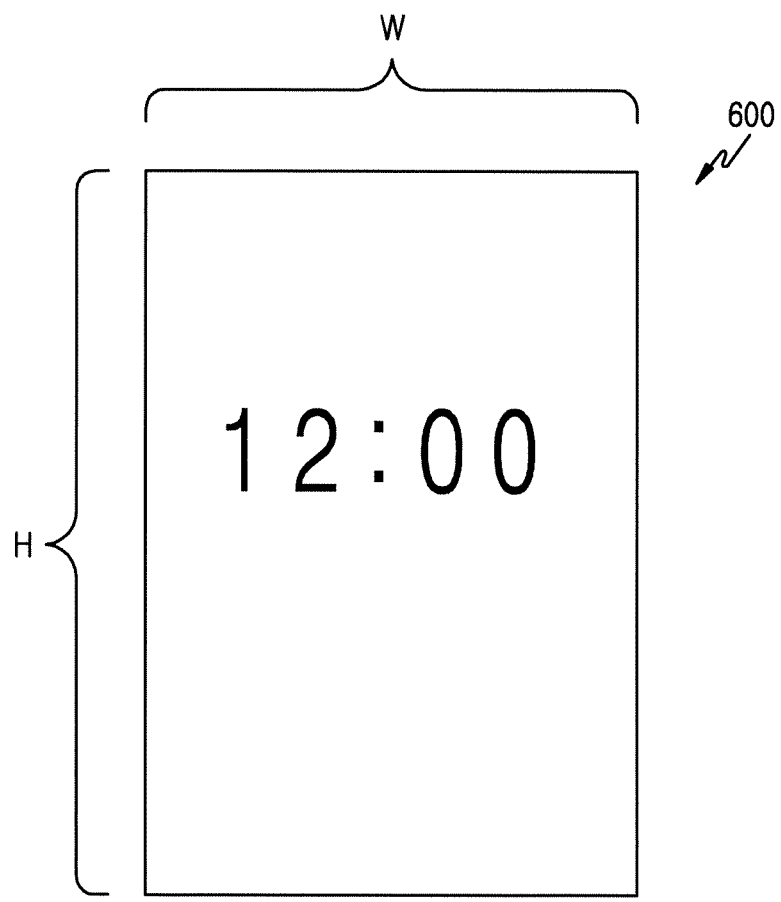
FIGS. 6A and 6B illustrate screen configurations of image information displayed on a display unit in an electronic device according to various embodiments of the present disclosure.
Figure 6B:
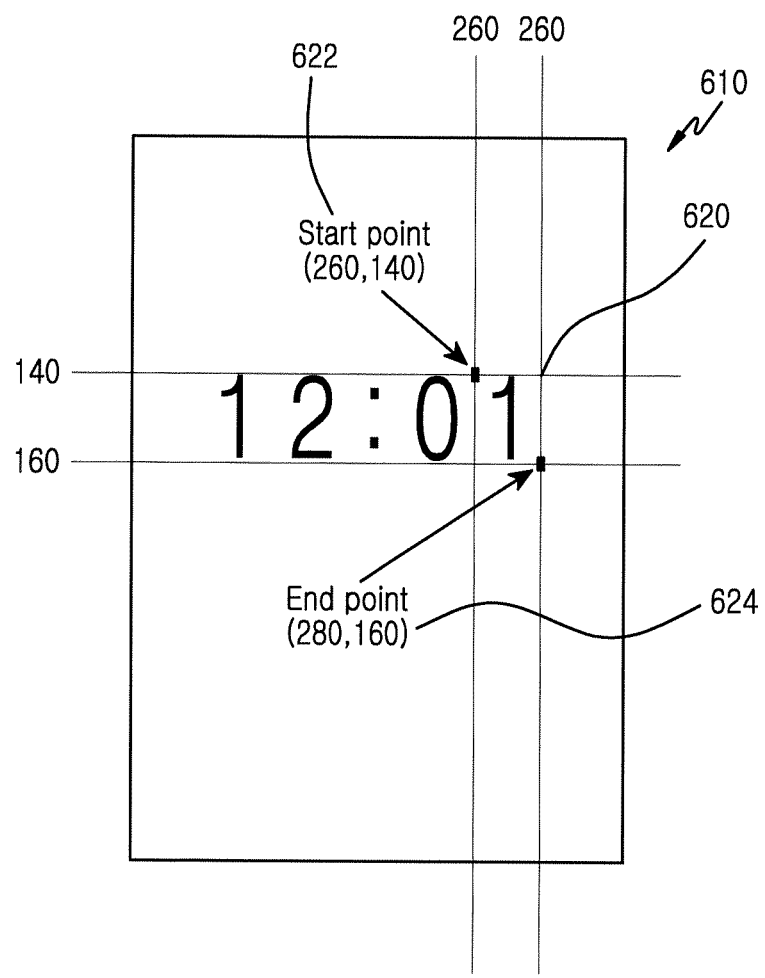

In operation 505, the processor 120 compares first image data that is previously transmitted for display on the display unit 300 with second image data generated in operation 503 and extracts a change area where image information is to be changed from image information displayed on the display unit 300. For example, when the second image data 610 including time information as in FIG. 6B is generated in a state in which image information corresponding to the first image data 600 including time information as in FIG. 6A is displayed on the display unit 300, the processor 120 compares the first image data 600 with the second image data 610 and extracts a change area 620 where image information is changed by the second image data 610 from the image information displayed on the display unit 300.

In operation 507, the processor 120 transmits information on the change area to the display 150. For example, the processor 120 transmits information of the change area 620, which includes location information (start coordinates 622 and end coordinates 624) of the change area 620 in the display unit 30 as in FIG. 6B and image data included in the change area 620, to the display 150.

In operation 509, the processor 120 is deactivated in order to reduce power consumption.

In the above-described embodiment, the processor 120 calculates the information of the change area 620 and transmits the information to the display 150 while operating in a low-power mode. When displaying image information on the display unit 300 in a bi-color scheme (for example, black and white) during a low-power mode, the processor 120 compresses image data for the change area 620 and transmits the compressed image data to the display 150. For example, the processor 120 can require RGB 24 bits in order to express color information of respective pixels constituting the image data. When the image information is expressed on the display unit 300 in a bi-color scheme, the processor 120 is able to express the color infonnation of the respective pixels by using one bit. Therefore, the processor 120 compresses 24 bits required to express the color information of the respective pixels into one bit and transmit the same to the display 150. In this case, the display 150 decodes or decompresses and displays the compressed information of the change area as illustrated in FIG. 7.

Figure 7:
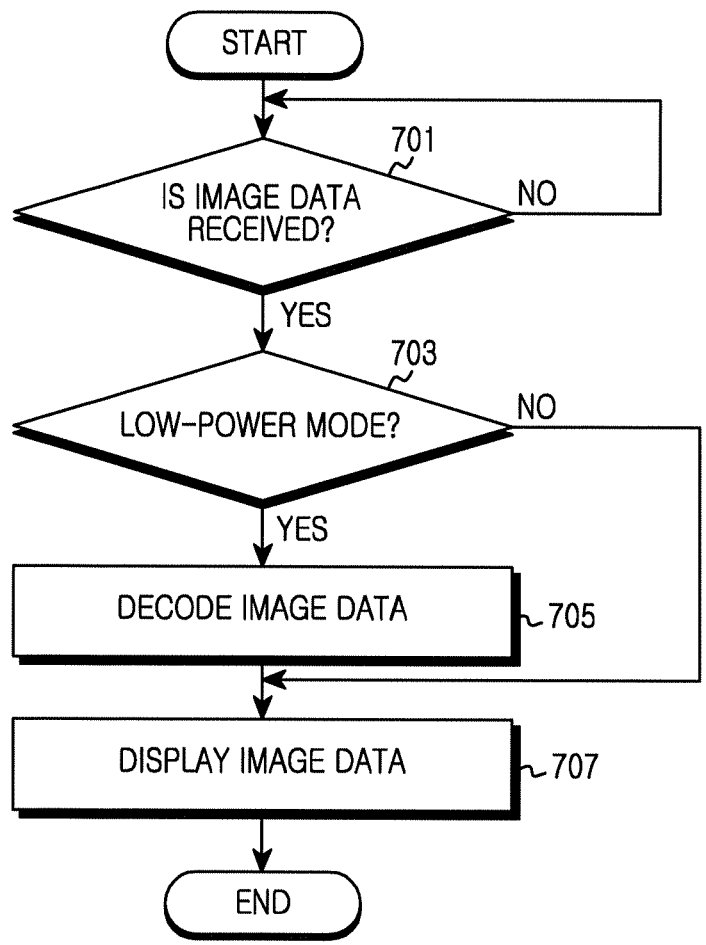
FIG. 7 illustrates a process for displaying image information on a display unit in an electronic device according to various embodiments of the present disclosure.

FIG. 7 illustrates a process for displaying image information in a display 150 of an electronic device 100 according to various embodiments of the present disclosure.

In operation 701, the display 150 determines whether image data is received from the processor 120.

When the image data is not received in operation 701, the display 150 again determines whether image data is received from the processor 120 in operation 701.

When the image data is not received in operation 701, the display 150 determines whether the electronic device 100 operates in a low-power mode in operation 703.

When the electronic device 100 operates in a low-power mode in operation 703, the display 150 recognizes that the processor 120 compresses and transmits the image data. Therefore, the display 150 restores the image data provided from the processor 120 in operation 705.

In operation 707, the display 150 displays image information corresponding to the restored image data on the display unit 300. For example, the display 150 allows the display unit 300 to display the image information corresponding to the image data of the change area 620 by using at least one of a gate driver 312 and a source driver 314.

When the electronic device 100 does not operate in a low-power mode in operation 703, the display 150 displays image information corresponding to image data provided from the processor 120 on the display unit 300 in operation 707.

Figure 8:
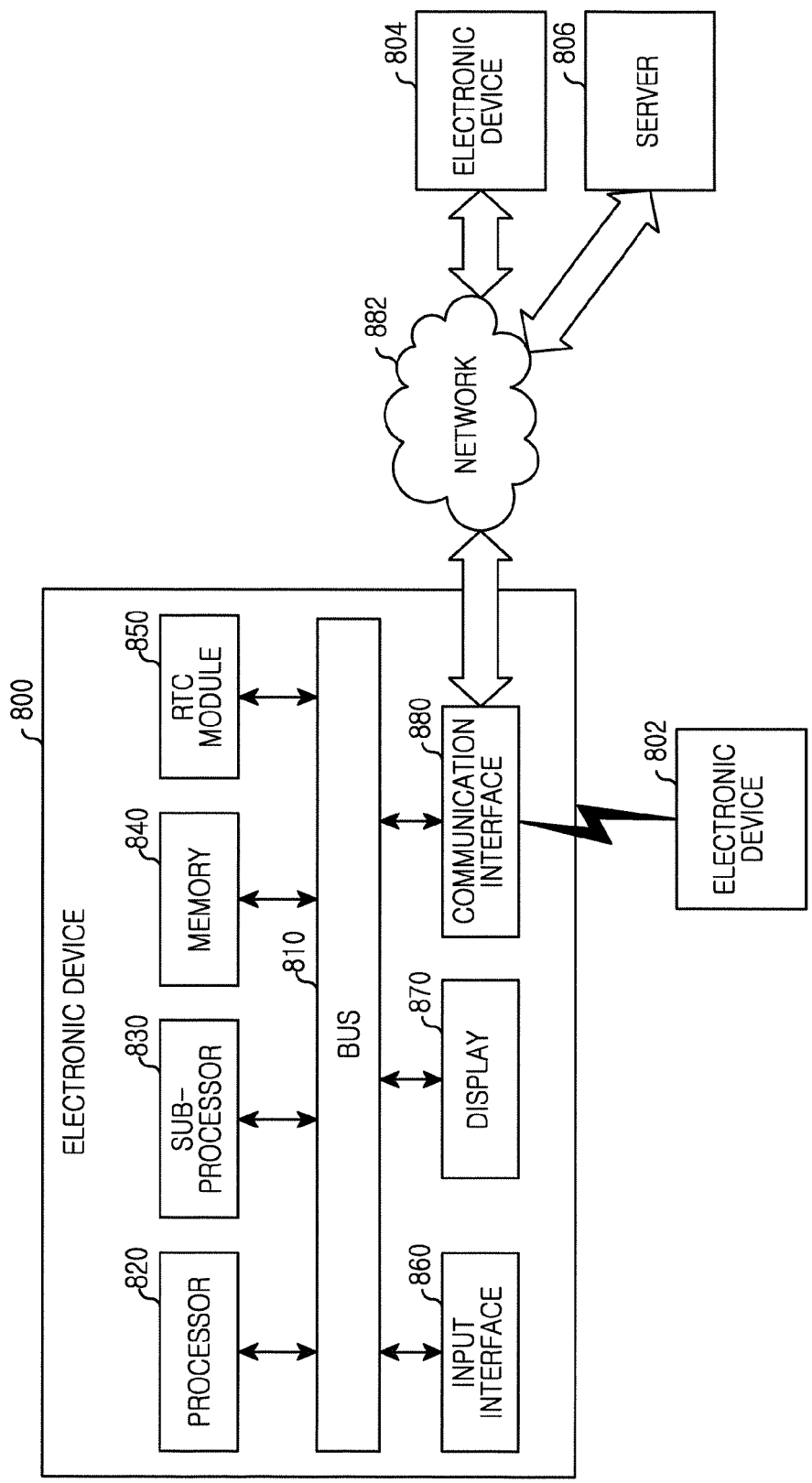
FIG. 8 illustrates a block diagram of an electronic device according to another embodiment of the present disclosure.

FIG. 8 illustrates a block diagram of an electronic device according to another embodiment of the present disclosure.

The electronic device 100 includes a bus 810, a processor 820, a sub-processor 830, a memory 840, a real time clock (RTC) module 850, an input unit 860, a display unit 870, and a communication unit 880. For example, a plurality of processors 820 or/and a plurality of memories 840 can be provided.

The bus 810 connects elements included in the electronic device 800 to one another, and transmits information (e.g., a control message) transmitted and received between the elements included in the electronic device 800.

The processor 820 performs control such that the electronic device 800 provides various services. For example, the processor 820 decodes a command received from one or more other elements (for example, the sub-processor 830, the memory 840, the RTC module 850, the input unit 860, the display 870, and communication unit 880) included in the electronic device 800 through the bus 810 and perform arithmetic operations or data processing according to the decoded command.

The processor 820 processes image data to be displayed using the display 870. For example, the processor 820 generates image data to be displayed through the display 870 and a control signal for allowing the image data to be displayed, and transmits the image data and the control signal to the display 870. For example, when the electronic device 800 switches to a low-power mode, the processor 820 generates image data to be displayed on the display 870 to transmit the image data to the display 870 according to the low-power mode, and activates the sub-processor 830. Thereafter, the processor 820 can be deactivated based on the low-power mode of the electronic device 800.

The sub-processor 830 processes the image data to be displayed using the display 870 during the low-power mode of the electronic device 800. For example, when the sub-processor 830 is activated by the processor 820 according to switching to the low-power mode in the electronic device 800, the sub-processor 830 generates image data to be displayed through display 870 and a control signal for allowing the image data to be displayed and transmits the image data and the control signal to the display 870. For example, the sub-processor 830 compares first image data corresponding to image information displayed on the display unit 300 or 1100 of the display 870 with second image data to be transmitted to the display 870, extracts information on a change area to be changed by the second image data from image information displayed on the display unit 300 or 1100 of the display 870, and transmits the information to the display 870. For example, the sub-processor 830 generates the second image data including time information based on time information provided from the RTC module 850. In another example, the sub-processor 830 selects at least one sub-frame from among sub-frames for at least one piece of image data that are capable of being transmitted to the display 870 and transmits the selected sub-frame to the display 870 during a pre-stored low-power mode. For example, the sub-processor 830 selects a sub-frame corresponding to time information to be transmitted to the display 870 based on the time information provided from the RTC module 850. The sub-frame for at least one piece of image data capable of being transmitted to the display 870 during the low-power mode can be stored in an internal memory of the sub-processor 830 or the memory 840 in the form of a sub-frame form as indicated in the following Table 1. When image information is displayed on the display unit 300 or 1100 of the display 870 in a bi-color scheme during the low-power mode, the electronic device 800 stores one or more sub-frames of which bits (for example, 24 bits) required to express color information of respective pixels are compressed into one bit as indicated by Table 1.

TABLE 1

| sub-frame | start address | size | data |
|---|---|---|---|
| 1 | 0x10001000 | 50 bytes | 0000 0000 1111 1000 0000 00 |
| | | | 0000 0011 1111 1000 0000 00 |
| | | | 0000 1111 1111 1000 0000 00 |
| | | | 0011 1110 1111 1000 0000 00 |
| | | | 0111 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0000 0000 1111 1000 0000 00 |
| | | | 0111 1111 1111 1111 1111 10 |
| | | | 0111 1111 1111 1111 1111 10 |
| | | | 0111 1111 1111 1111 1111 10 |
| | | | 0111 1111 1111 1111 1111 10 |
| 2 | 0x10002000 | 50 bytes | XXXX XXXX XXXX XXXX XXXX XX |
| | | | ... (omitted) ... |
| | | | XXXX XXXX XXXX XXXX XXXX XX |
| 3 | 0x10003000 | 50 bytes | XXXX XXXX XXXX XXXX XXXX XX |
| | | | ... (omitted) ... |
| | | | XXXX XXXX XXXX XXXX XXXX XX |
| 4 | 0x10004000 | 50 bytes | XXXX XXXX XXXX XXXX XXXX XX |
| | | | ... (omitted) ... |
| | | | XXXX XXXX XXXX XXXX XXXX XX |
| 5 | 0x10005000 | 50 bytes | XXXX XXXX XXXX XXXX XXXX XX |
| | | | ... (omitted) ... |
| | | | XXXX XXXX XXXX XXXX XXXX XX |
| 6 | 0x10006000 | 50 bytes | XXXX XXXX XXXX XXXX XXXX XX |
| | | | ... (omitted) ... |
| | | | XXXX XXXX XXXX XXXX XXXX XX |
| 7 | 0x10007000 | 50 bytes | XXXX XXXX XXXX XXXX XXXX XX |
| | | | ... (omitted) ... |
| | | | XXXX XXXX XXXX XXXX XXXX XX |
| 8 | 0x10008000 | 50 bytes | XXXX XXXX XXXX XXXX XXXX XX |
| | | | ... (omitted) ... |
| | | | XXXX XXXX XXXX XXXX XXXX XX |

TABLE 1-continued

| sub-frame | start address | size | data |
|---|---|---|---|
| 9 | 0x10009000 | 50 bytes | XXXX XXXX XXXX XXXX XXXX XX ... (omitted) ... XXXX XXXX XXXX XXXX XXXX XX |
| 0 | 0x1000A000 | 50 bytes | XXXX XXXX XXXX XXXX XXXX XX ... (omitted) ... XXXX XXXX XXXX XXXX XXXX XX |

Table 1 represents a sub-frame of 20×20 pixels and each bit expressed in a data field represents a value obtained by compressing a bit value necessary to express color information of each pixel into one bit. The sub-processor 830 selects a sub-frame to be transmitted to the display 870 from the memory 840 by using a value of a start address field and a value of a size field in Table 1, and transmits a value of a data field of the selected sub-frame to the display 870.

The memory 840 stores an instruction or data received from or generated by one or more elements (the processor 820, the sub-processor 830, the RTC module 850, the input unit 860, the display 870, and the communication unit 880) included in the electronic device 800.

The memory 840 stores one or more programs for services of the electronic device 800. For example, the memory 840 includes one or more of a graphic user interface (GUI) program and a communication control program that are executed by the processor 820 for the services of the electronic device 800.

The RTC module 850 provides time information for driving of the electronic device 800.

The input unit 860 detects an instruction or data that is input by the user. For example, the input unit 860 transmits an instruction or data that is input by the user to the processor 820 or the memory 840 through the bus 810. For example, the input unit 860 includes one or more of a keypad including at least one hardware button and a touch panel for detecting touch information.

Figure 11:
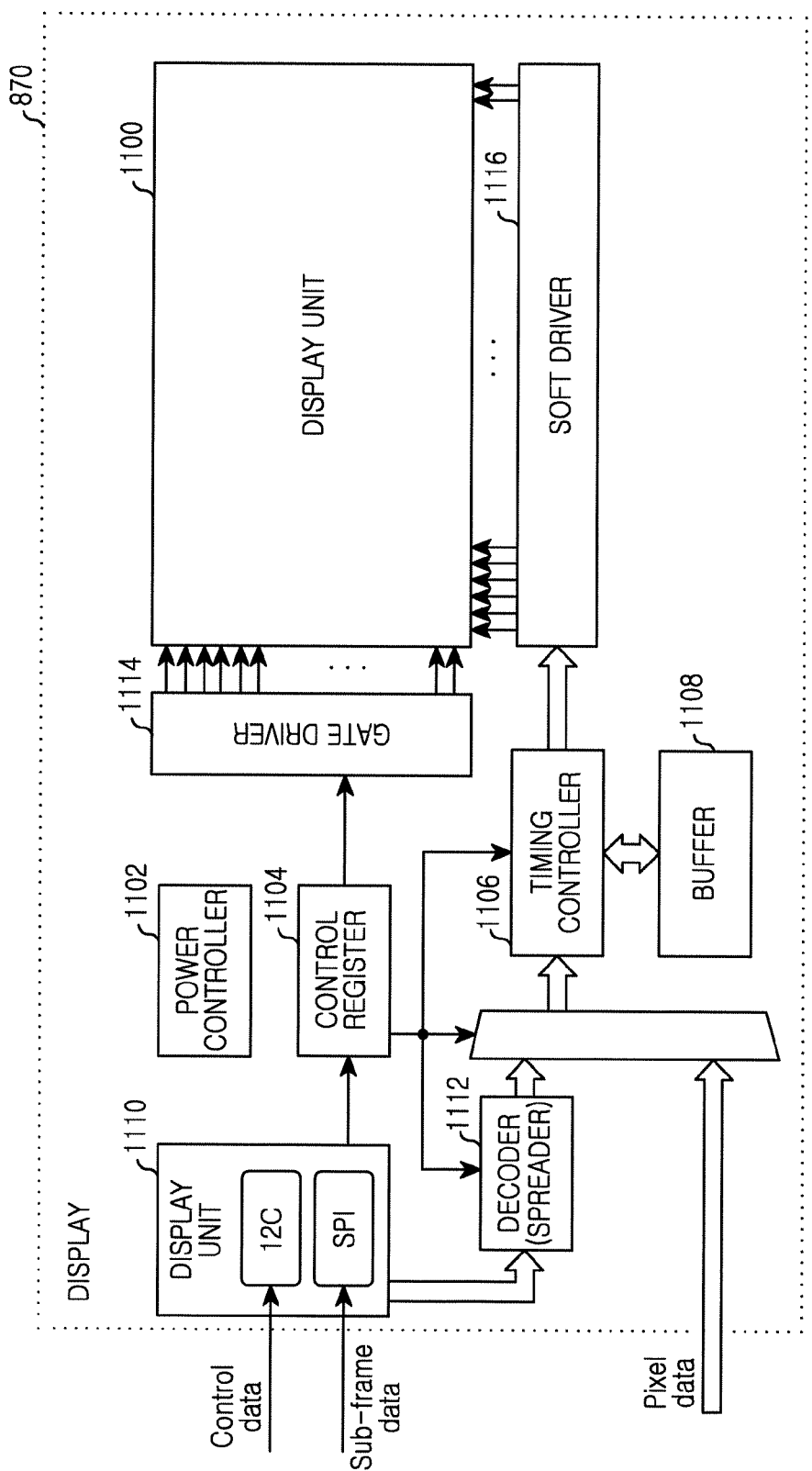
FIG. 11 illustrates a detailed block diagram of a display according to another embodiment of the present disclosure.

The display 870 displays a still image, a moving image, or data to the user. For example, when the sub-processor 830 transmits sub-frame data that is compressed as in Table 1, the display 870 decodes the sub-frame data into image information for display and display the image information. For example, as illustrated in FIG. 3 or 11, the display 870 includes the display unit 300 or 1100 configured by a plurality of pixels to display an image and a display driver IC (DDI) configured to control the pixels included in the display unit 300 or 1100 so as to display an image.

The communication unit 880 communicably connects the electronic device 800 to one or more other electronic devices 802 or 804, a server 806, or one or more peripheral devices.

In the above-described embodiment, the sub-processor 830 selects at least one sub-frame from among sub-frames for at least one piece of image data that are capable of being transmitted to the display 870 and transmits the selected sub-frame to the display 870 during a pre-stored low-power mode.

In another embodiment, the sub-processor 830 transmits an index for image data to be transmitted to the display 870 to the display 870. In this case, the display 870 extracts image data corresponding to the index provided from the sub-processor 830 from a list of pieces of displayable image data and displays the image data during a pre-stored low-power mode.

Figure 9:
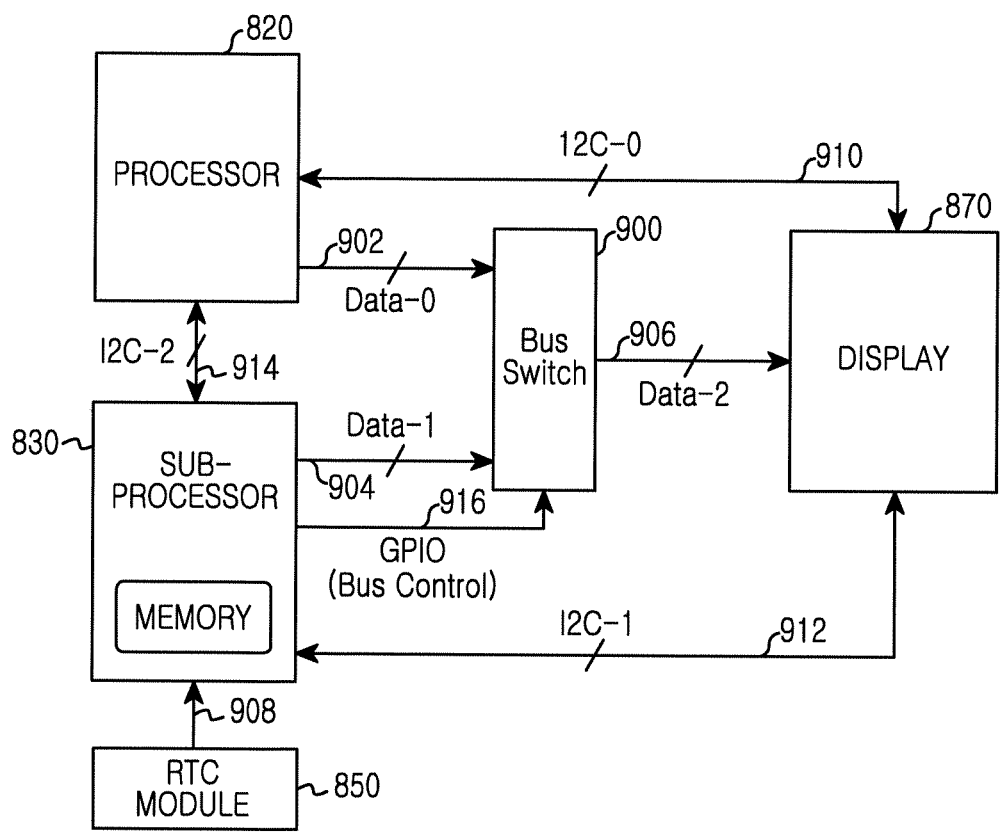
FIG. 9 is a block diagram illustrating connections between internal modules of an electronic device according to another embodiment of the present disclosure.

FIG. 9 is a block diagram illustrating connections between internal modules of an electronic device according to another embodiment of the present disclosure.

The bus 810 includes control interfaces 910, 912, 914 and 916 for transmitting and receiving control signals between elements (for example, the processor 820, the sub-processor 830, the RTC module 850, the display 870) included in the electronic device 800 and data interfaces 902, 904, 906 and 908 for transmitting and receiving data between the elements included in the electronic device 800.

When the processor 820 is not deactivated, the processor 820 transmits a control signal to the display 870 through a first control interface I2C-0 910 and transmits image data to the display 870 through a first data interface data-0 902.

When the electronic device 800 switches to a low-power mode, the processor 820 transmits a control signal for activating the sub-processor 830 through a third control interface I2C-2 914.

When the sub-processor 830 is activated according to the control signal provided from the processor 820 through the third control interface I2C-2 914, the sub-processor 830 transmits the control signal to the display 870 through the second control interface I2C-1 912 and transmits the image data to the display 870 through the second data interface data-1 904. In this case, the sub-processor 830 generates and selects image data to be transmitted to the display 870 based on time information provided from the RTC module 850 through a fourth data interface 908.

In the above-described embodiment, the processor 820 transmits the image data to the display 870 through the first data interface 902, and the sub-processor 830 transmits the image data to the display 870 through the second data interface 904. In this case, the bus 810 includes a bus switch 900 that transmits data to the display 870 through the third data interface 906. The bus switch 900 transmits any one of the image data provided from the processor 820 through the first interface 902 and the image data provided from the sub-processor 830 through the second data interface 904 to the display 870 through the third data interface 906 depending on an operation mode of the electronic device 800. For example, the bus switch 900 selects image data to be transmitted to the display 870 based on the control signal provided from the sub-processor 830 through the fourth control interface 916.

Figure 10:
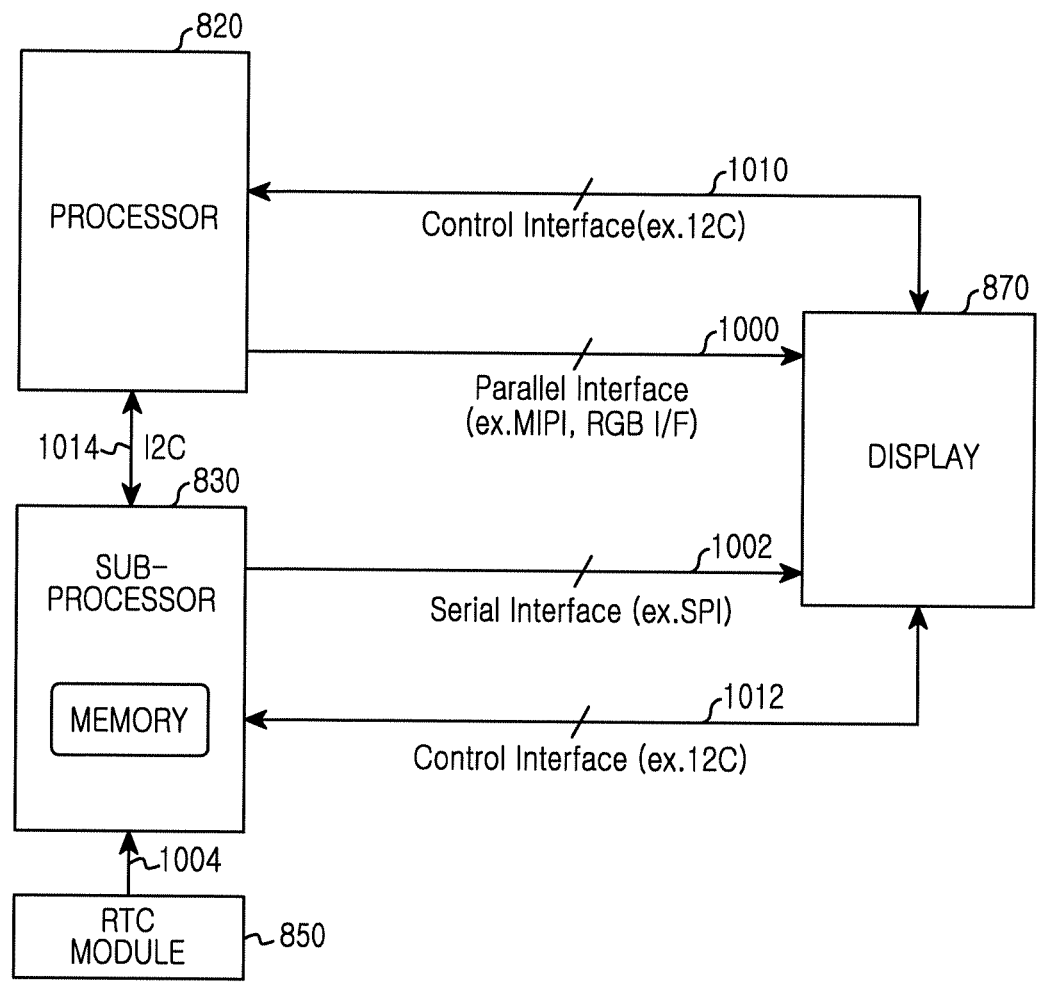
FIG. 10 is a block diagram illustrating connections between internal modules of an electronic device according to another embodiment of the present disclosure.

FIG. 10 is a block diagram illustrating connections between internal modules of an electronic device according to another embodiment of the present disclosure.

The bus 810 includes control interfaces 1010, 1012 and 1014 for transmitting and receiving control signals between elements (for example, the processor 820, the sub-processor 830, the RTC module 850, the display 870) included in the electronic device 800 and data interfaces 1000, 1002 and 1004 for transmitting and receiving data between the elements included in the electronic device 800.

When the processor 820 is not deactivated, the processor 820 transmits a control signal to the display 870 through a first control interface I2C-0 1010 and transmits image data to the display 870 through a first data interface 1000. The first data interface 1000 is a parallel interface and includes one or more of a mobile industry processor interface (MIPI), a red-green-blue (RGB) interface.

When the electronic device 800 switches to a low-power mode, the processor 820 transmits a control signal for activating the sub-processor 830 through a third control interface I2C 1014.

When the sub-processor 830 is activated according to the control signal provided from the processor 820 through the third control interface I2C 1014, the sub-processor 830 transmits the control signal to the display 870 through the second control interface I2C 1012 and transmits the image data to the display 870 through the second data interface 1002. The second data interface 1002 is a serial interface, and includes a serial to peripheral interface (SPI).

The sub-processor 830 generates and selects image data to be transmitted to the display 870 based on time information provided from the RTC module 850 through a third data interface 1004.

FIG. 11 illustrates a detailed block diagram of a display according to another embodiment of the present disclosure.

The display 870 includes the display unit 1100 configured in such a way that a plurality of pixels are arranged and the display driver IC (DDI) configured to drive the pixels included in the display unit 1100.

The DDI includes a power controller 1102, a control register 1104, a timing controller 1106, a buffer 1108, an input interface 1110, a decoder 1112, a gate driver 1114, and a source driver 1116. Since the other modules except for the input interface 1110 included in the DDI operate similarly to the modules included in the DDI illustrated in FIG. 3, a description thereof will be omitted.

The input interface 1110 provides a signal to a module corresponding to a characteristic of a signal provided from the processor 820 or the sub-processor 830. For example, when image data having a sub-frame form is provided from the sub-processor 830, the input interface 1110 transmits the image data provided from the sub-processor 830 to the decoder 1112 to restore the image data.

Figure 12:
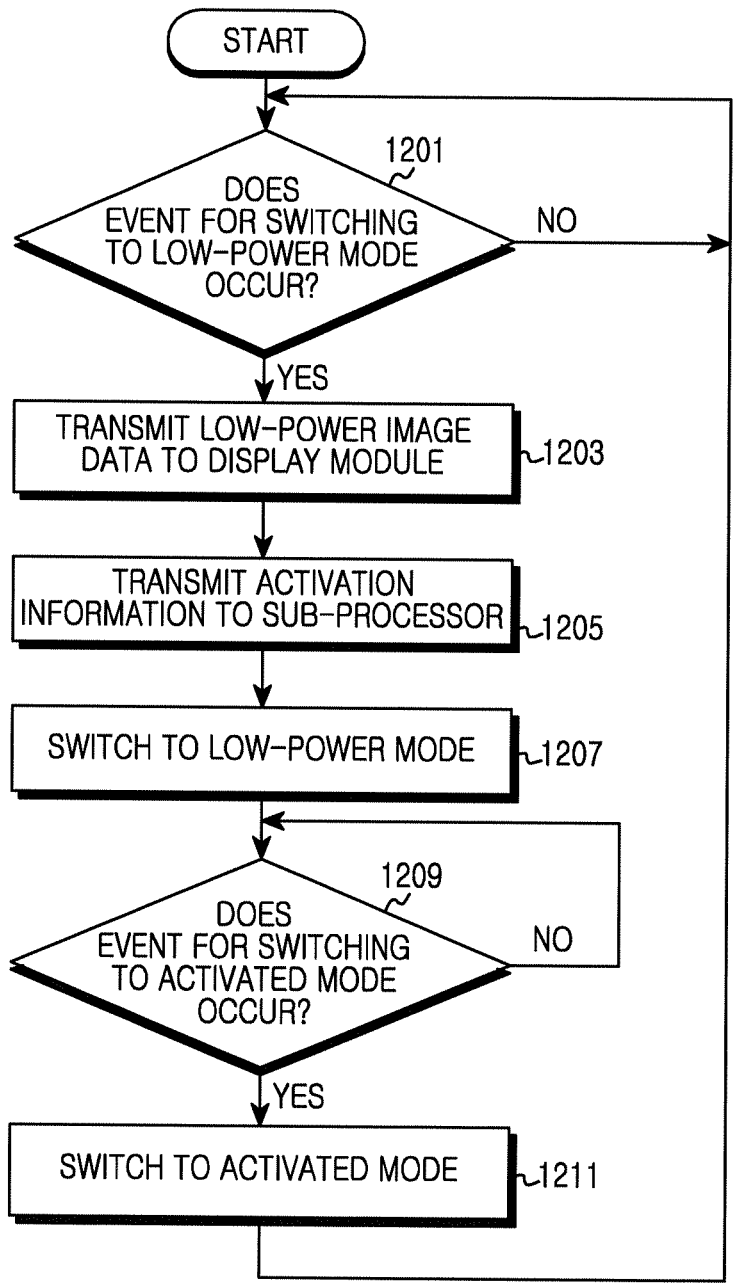
FIG. 12 illustrates a process for switching to a low-power mode in a processor of an electronic device according to various embodiments of the present disclosure.

FIG. 12 illustrates a process for switching to a low-power mode in a processor 820 of an electronic device 800 according to various embodiments of the present disclosure.

In operation 1201, the processor 820 determines whether an event for switching to a low-power mode occurs. For example, the processor 820 determines whether a selection of a power button is detected through the input unit 860. In another example, the processor 820 determines whether a reference time has lapsed after detection of an input of a user through the input unit 860.

When the event for switching to the low-power mode does not occur in operation 1201, the processor 820 again determines whether the event for switching to the low-power mode occurs in operation 1201.

When the event for switching to the low-power mode occurs in operation 1201, the processor 820 generates low-power image data and transmits the low-power image data to the display 870 in operation 1203. For example, the processor 820 generates low-power image data including one or more of time information on a time point at which the event for switching to the low-power mode occurs and information on a battery remaining capacity and transmits the low-power image data to the display 870.

In operation 1205, the processor 820 transmits activation control information to the sub-processor 830 to allow the sub-processor 830 to be activated.

In operation 1207, the processor 820 is deactivated based on the switching to the low-power mode in the electronic device 800.

In operation 1209, the processor 820 determines whether an event for switching to the activated mode occurs. For example, the processor 820 determines whether a user input is detected through the input unit 860. In another example, the processor 820 determines whether a service provision signal is received through the communication unit 880. In another example, the processor 820 determines whether a signal requesting switching to an activated mode is received from the sub-processor 830 or a separate control module.

When the event for switching to the activated mode does not occur in operation 1209, the processor 820 again determines whether the event for switching to the activated mode occurs in operation 1209.

When the event for switching to the activated mode occurs in operation 1209, the processor 820 is activated based on the electronic device 800's switching operation to the activation mode in operation 1211. In this case, the processor 820 transmits deactivation control information to the sub-processor 830 to allow the sub-processor 830 to be deactivated.

Figure 13:
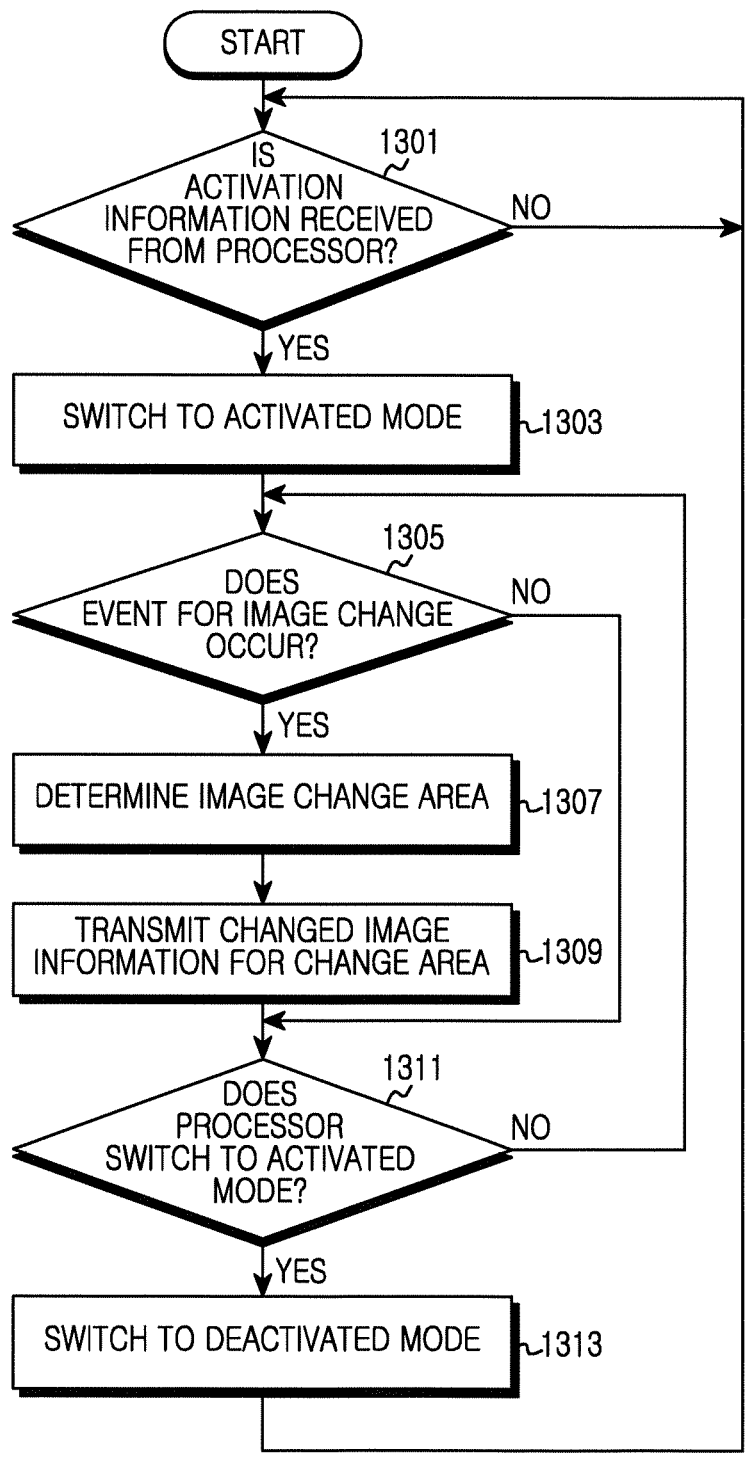
FIG. 13 illustrates a process for transmitting image data to a display in a sub-processor of an electronic device according to various embodiments of the present disclosure.

FIG. 13 illustrates a process for transmitting image data to a display in a sub-processor of an electronic device according to various embodiments of the present disclosure. A feature of the present disclosure for transmitting image data will be described with reference to a screen configuration illustrated in FIGS. 14a and 14b.

In operation 1301, the sub-processor 830 determines whether activation control information is received from the processor 820.

When the activation control information is not received from the processor 820 in operation 1301, the sub-processor 830 determines whether activation control information is received from the processor 820 while maintaining a deactivated state in operation 1301.

When the activation control information is received from the processor 820 in operation 1301, the sub-processor 830 recognizes that the processor 820 is deactivated according to switching to a low-power mode of the electronic device 800. Therefore, the sub-processor 830 can be activated in order to generate image data to be transmitted to the display 870 during the low-power mode of the electronic device 800 in operation 1303.

In operation 1305, the sub-processor 830 determines whether an event for image change occurs. For example, the sub-processor 830 determines whether a period (for example, second/minute/hour) for changing image data displayed on the display 870 is reached based on time information provided from the RTC module 850. In another example, the sub-processor 830 determines whether a period for measuring a battery remaining capacity is reached. The period for measuring a battery remaining capacity can be identical to or different from a time change period.

When the event for image change does not occur in operation 1305, the sub-processor 830 determines whether the processor 820 is activated in operation 1311.

Figure 14A:
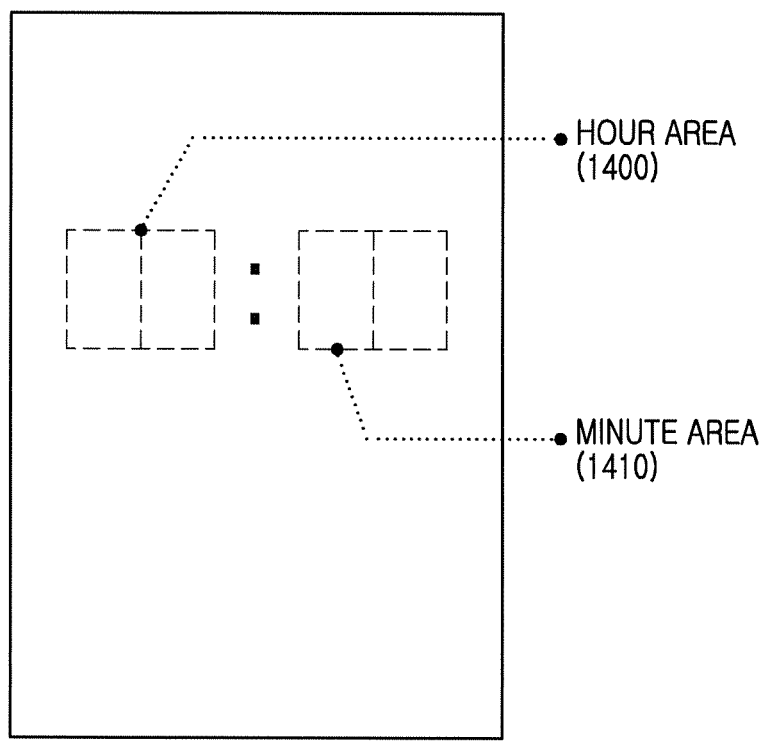
FIGS. 14A and 14B illustrate a change area in an electronic device according to various embodiments of the present disclosure.
Figure 14B:
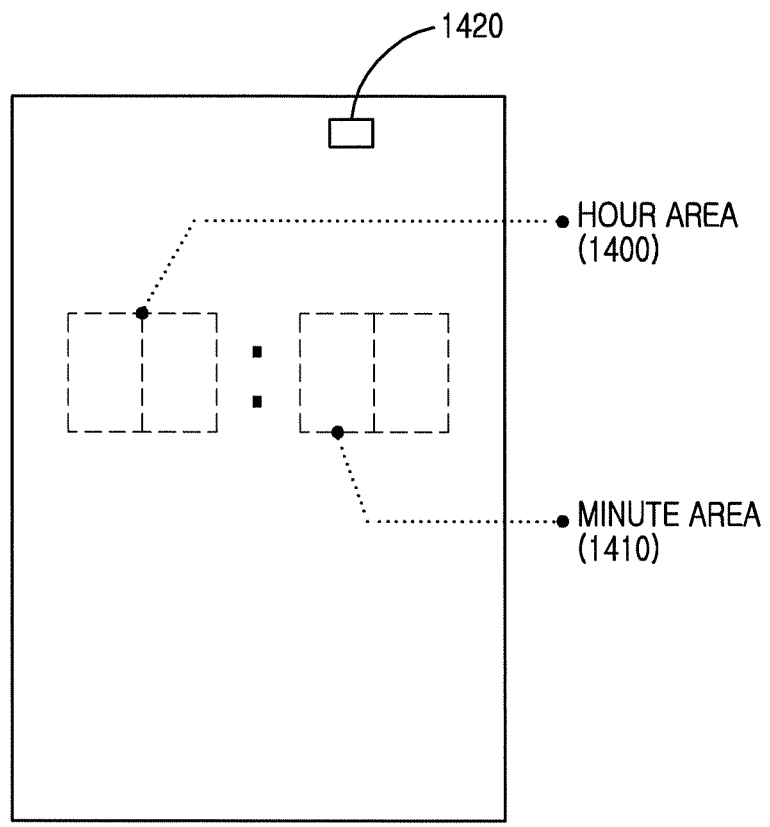

When the event for image change occurs in operation 1305, the sub-processor 830 determines an image change area in operation 1307. For example, when time information is displayed on the display unit 300 or 1100 during the low-power mode as illustrated in FIG. 14A, the sub-processor 830 determines an area where time information is to be changed from among an hour area 1400 and a minute area 1410 based on time information provided from the RTC module 850. Additionally, when time information and battery information are displayed during the low-power mode as illustrated in FIG. 14B, the sub-processor 830 determines a battery display area 1420 as an image change area according to whether a battery remaining capacity is changed.

In operation 1309, the sub-processor 830 generates changed image data for the image change area and transmits the changed image data to the display 870. For example, the sub-processor 830 selects a sub-frame to be displayed on the image change area from among one or more preset sub-frames and transmits the selected sub-frame to the display 870.

In operation 1311, the sub-processor 830 determines whether the processor 820 is activated. For example, the sub-processor 830 determines whether deactivation control information is received from the processor 820. When the deactivation control information is received from the processor 820, the sub-processor 830 recognizes that the processor 820 is activated.

When the processor 820 is not activated in operation 1311, the sub-processor 830 determines whether the event for image change occurs in operation 1305.

When the processor 820 is activated in operation 1311, the sub-processor 830 is deactivated in operation 1313.

Figure 15:
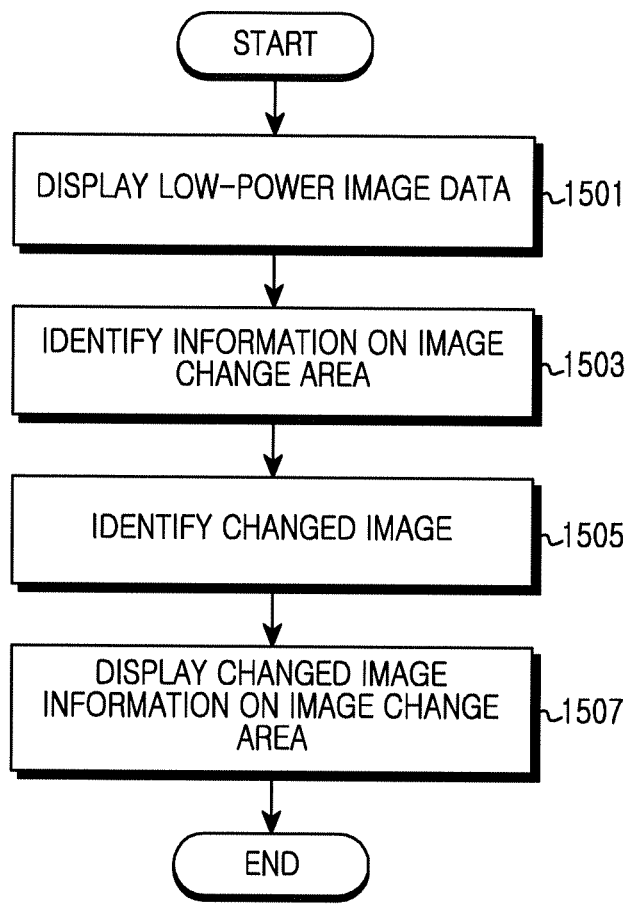
FIG. 15 illustrates a process for displaying image information corresponding to low-power image data in a display of an electronic device according to various embodiments of the present disclosure.

FIG. 15 illustrates a process for displaying image information corresponding to low-power image data in a display 870 of an electronic device 800 according to various embodiments of the present disclosure. A feature of the present disclosure for displaying image information will be described with reference to screen configurations illustrated in FIGS. 6A, 16B, 17A and 17B.

Figure 16A:
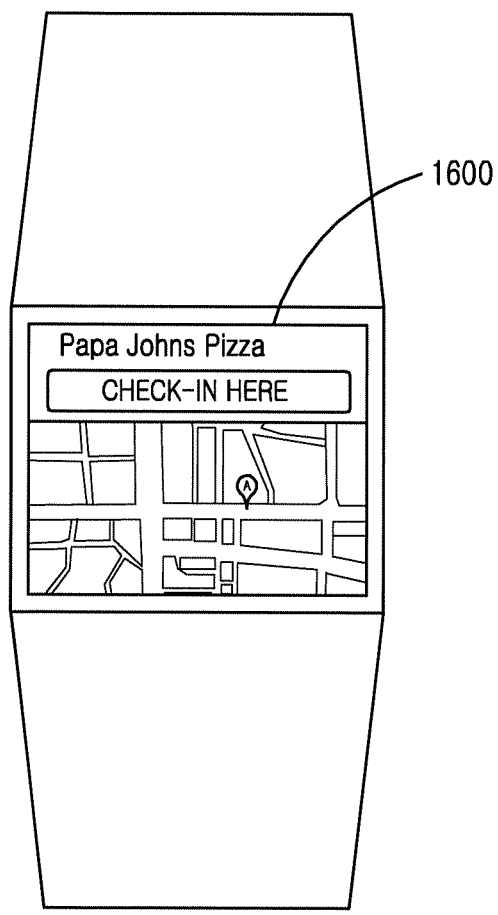
FIGS. 16A and 16B illustrate a configuration for displaying image information in a wearable electronic device according to various embodiments of the present disclosure.
Figure 16B:
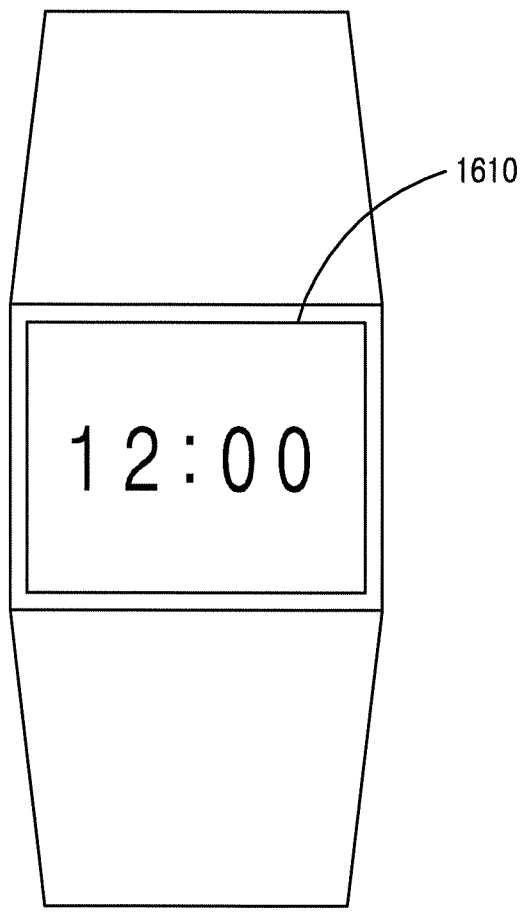
Figure 17A:
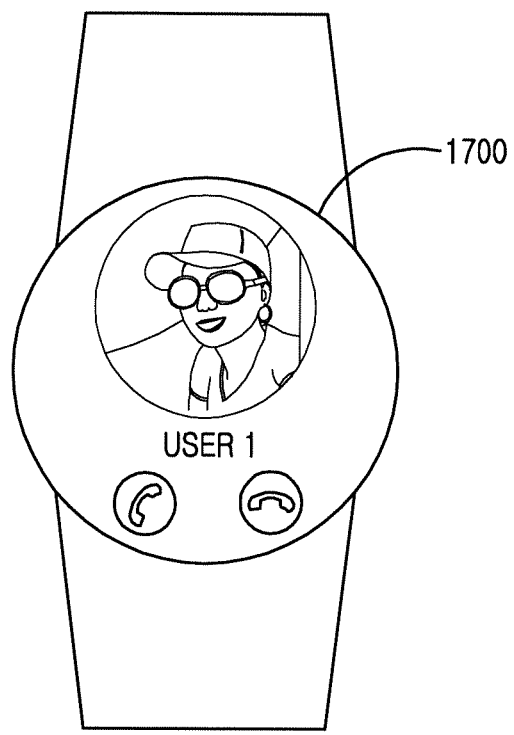
FIGS. 17A and 17B illustrate a configuration for displaying image information in a wearable electronic device according to another embodiment of the present disclosure.
Figure 17B:
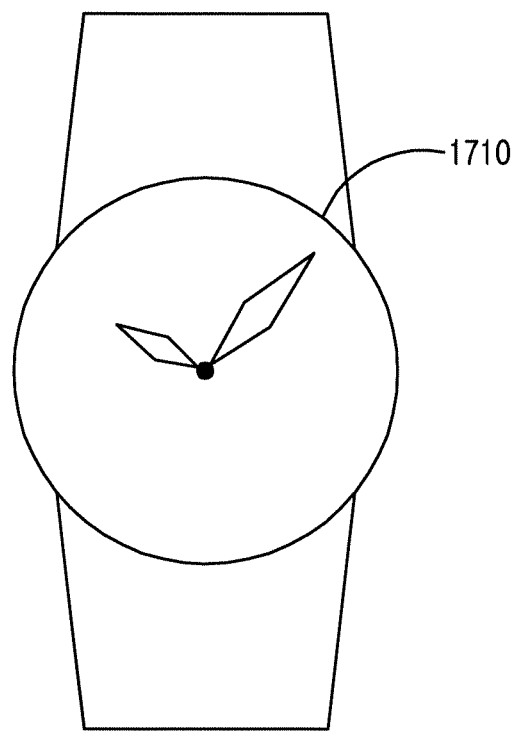

In operation 1501, the display 870 displays image information corresponding to low-power image data on the display unit 300 or 1100. For example, the display 870 of the wearable electronic device 800 including a display unit 1100 having a rectangular shape displays a map service screen 1600 as illustrated in FIG. 16A. When the wearable electronic device 800 switches to a low-power mode, the display 870 of the wearable electronic device 800 displays image information 1610 including time information in a numeral shape as in FIG. 16B on the display unit 300 or 1100 based on the low-power image data provided from the processor 820. In another example, the display 870 of the wearable electronic device 800 including a display unit 1100 having a circular shape displays a call service screen 1700 as illustrated in FIG. 17A. When the wearable electronic device 800 switches to a low-power mode, the display 870 of the wearable electronic device 800 displays image information 1710 including time information in a needle shape as in FIG. 17B on the display unit 300 or 1100 based on the low-power image data provided from the processor 820.

In operation 1503, the display 870 identifies information on the image change area. For example, the display 870 receives the information on the image change area that is transmitted by the sub-processor 830 according to occurrence of an event for image change as described with reference to FIG. 13.

In operation 1505, the display 870 identifies changed image data for the image change area. For example, the display 870 restores data of a sub-frame provided from the sub-processor 830 and identifies image data to be displayed on the image change area.

In operation 1507, the display 870 changes the image change area by using the changed image data identified in operation 1505.

Figure 18:
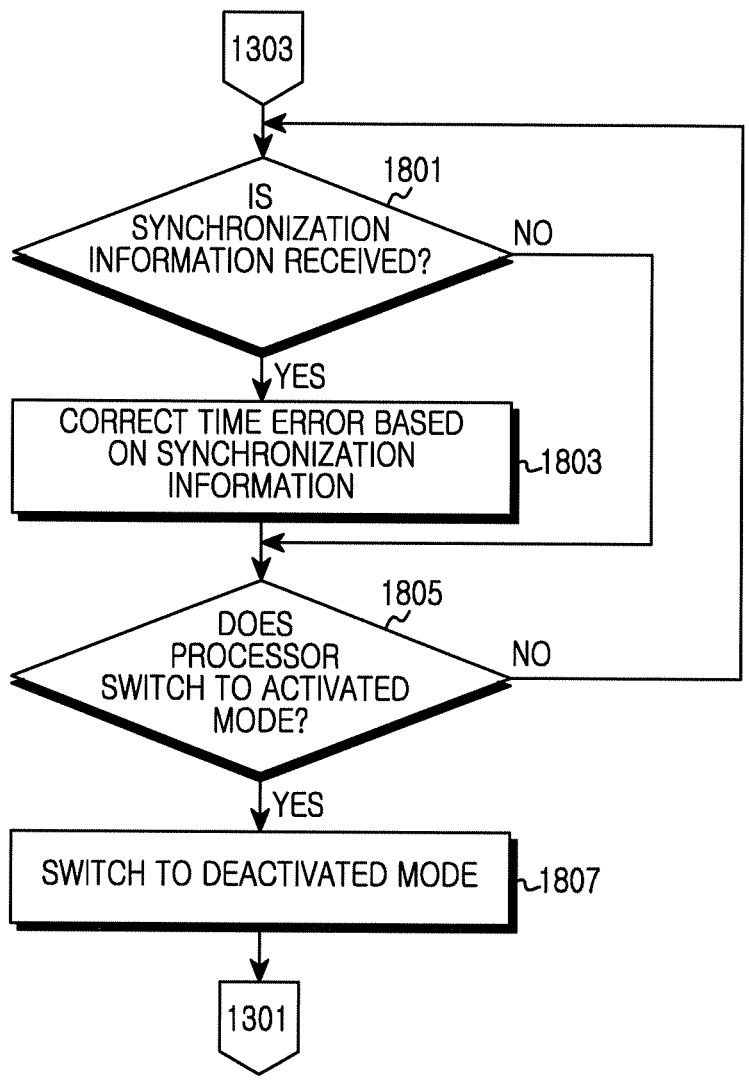
FIG. 18 illustrates a process for correcting a time error in an electronic device according to various embodiments of the present disclosure.

FIG. 18 illustrates a process for correcting a time error in the electronic device 800 according to various embodiments of the present disclosure. In the following description, it can be assumed that the electronic device is wearable.

When the sub-processor 830 is activated based on activation control information provided from the processor 820 in operation 1303 of FIG. 13, the sub-processor 830 determines whether synchronization information is received from a counterpart electronic device connected thereto through a short-range communication network in operation 1801. The short-range communication network includes at least one of a Bluetooth network, a wireless LAN (IEEE 802.11a/b/g/n/ac/ad), a Zigbee (IEEE 802.14) network, a radio frequency identification (RFID) network, an infrared data association (IrDA) network, a visual light communication (VLC) network, a human body communication network, an E-field communication (EFC) network, and a near field communication (NFC) network.

When the synchronization information is received from the counterpart electronic device in operation 1801, the sub-processor 830 corrects a time error by using the synchronization information provided from the counterpart electronic device in operation 1803. For example, the sub-processor 830 corrects a time error in the RTC module 850 based on the synchronization information provided from the counterpart electronic device.

When the synchronization information is not received from the counterpart electronic device in operation 1801, the sub-processor determines whether the processor 820 is activated in operation 1805. For example, the sub-processor 830 determines whether deactivation control information is received from the processor 820. When the deactivation control information is received from the processor 820, the sub-processor 830 recognizes that the processor 820 is activated.

When the processor 820 is not activated in operation 1805, the sub-processor 830 determines whether the synchronization information is received from the counterpart electronic device connected thereto through the short-range communication network in operation 1801.

When the processor 820 is activated in operation 1805, the sub-processor 830 is deactivated in operation 1807.

In the above-described embodiment, when the wearable electronic device receives the synchronization information from the counterpart electronic device connected thereto through the short-range communication network, the wearable electronic device can correct a time error by using the synchronization information provided from the counterpart electronic device.

In another embodiment, when the wearable electronic device periodically requests synchronization information from the counterpart electronic device connected thereto through the short-range communication network and receives the synchronization information, the wearable electronic device corrects a time error by using the synchronization information provided from the counterpart electronic device.

According to various embodiments of the present disclosure, in a case in which an electronic device operates in a low-power mode, when it is necessary to display image information, or to generate image data, such as change image information displayed on a display unit, the electronic device activates a processor to generate image data and transmits the image data to a display, thereby continuously displaying image information, such as time information and battery information.

According to various embodiments of the present disclosure, in a case in which the electronic device operates in a low-power mode, the electronic device generates image data and transmits the image data to the display by using a main processor and a separate sub-processor with low power consumption, thereby continuously displaying image information.

According to various embodiments of the present disclosure, in a case in which the electronic device operates in a low-power mode, the electronic device images data generated to include data for pixels of a change area and not to include data for pixels of a background area except for the change area or image data generated to express data for pixels in a bi-color scheme to the display, thereby minimizing a data transmission amount for expression of image information and therefore, reducing power consumption.

While the disclosure has been shown and described with reference to certain exemplary embodiments thereof, it will be understood by those skilled in the art that various changes in form and details can be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating an electronic device, the method comprising:
   in response to detecting an input for switching an operation mode from a normal-power mode to a low-power mode, displaying, by a display in the electronic device, a first image corresponding to first image data generated by a main processor in the electronic device;
   in response to displaying the first image, activating a sub-processor in the electronic device and deactivating the main processor;
   generating, by the activated sub-processor, second image data for updating the first image data according to an activation period being reached, wherein content in an area of the second image data is different from content in a corresponding area in the first image data;
   transmitting, by the sub-processor, change information, wherein the change information is a difference between the content in the corresponding area of the first image data and the content in the area of the second image data to the display; and
   displaying, by the display, a second image corresponding to the second image data based on the change information.

2. The method of claim 1,
   wherein the activation period indicates a time point at which time information is to be updated, and
   wherein the first image data includes time information before the activation is reached and the second image data includes time information when the activation is reached.

3. The method of claim 2, wherein generating the second image data comprises:
   determining, by the sub-processor, time information provided by a real-time clock (RTC) in the electronic device according to the activation period being reached; and
   generating the second image data based on the determined time information.

4. The method of claim 1, wherein the activation period indicates a time point at which battery information is to be updated, and
   wherein the first image data includes battery information before the activation period is reached and wherein the second image data includes battery information when the activation period is reached.

5. The method of claim 1, wherein transmitting the change information comprises:
   identifying, by the sub-processor, the difference between the corresponding area of the first image data and the area of the second image data;
   detecting, by the sub-processor, a change area where the first image displayed on the display in the electronic device is to be changed based on the difference; and
   transmitting, by the sub-processor, the change information for the change area to the display.

6. The method of claim 5, wherein transmitting the change information comprises generating the change information by reducing a number of bits representing a color of each of pixels corresponding to a change area where the first image displayed on the display in the electronic device is to be changed based on the difference.

7. The method of claim 6, wherein the number of bits is reduced from 24 bits to 1-bit.

8. The method of claim 1, wherein the display comprises a display driver integrated-chip (DDI) and a display unit,
   wherein the DDI receives the change information, determines the second image based on the change information, and controls the display unit to display the determined second image.

9. The method of claim 1, wherein a size of the first image data is greater than a size of the second image data, and
   wherein the second image data is generated by the sub-processor without operating the main processor.

10. The method of claim 1, wherein the change information comprises at least one subframe;
    wherein the subframe is identified among a plurality of subframes based on the difference between the first image data and the second image data.

11. An electronic device comprising:
    a display;
    a main processor; and
    a sub-processor,
    wherein in response to detecting an input for switching an operation mode from a normal-power mode to a low-power mode, the display is configured to display a first image corresponding to first image data generated by a main processor in the electronic device,
    wherein in response to display the first image, the sub-processor is configured to be activated and the main processor is configured to be deactivated,
    wherein the sub-processor is further configured to:
      generate second image data for updating the first image data according to an activation period being reached, wherein content in an area of the second image data is different from content in a corresponding area in the first image data; and
      transmit, to a display in the electronic device, change information, wherein the change information is a difference between the content in the corresponding area of the first image data and the content in the area of the second image data, and
    wherein the display is further configured to display a second image corresponding to the second image data based on the change information.

12. The electronic device of claim 11,
    wherein the activation period indicates a time point at which time information is to be updated, and
    wherein the first image data includes time information before the activation is reached and the second image data includes time information when the activation is reached.

13. The electronic device of claim 12, wherein the sub-processor is configured to:
    determine time information provided by a real-time clock (RTC) in the electronic device according to the activation period being reached; and
    generate the second image data based on the determined time information.

14. The electronic device of claim 11, wherein the activation period indicates a time point at which battery information is to be updated, and wherein the first image data includes battery information before the activation period is reached and wherein the second image data includes battery information when the activation period is reached.

15. The electronic device of claim 11, wherein the sub processor is configured to:

identify the difference between the corresponding area of the first image data and the area of the second image data detect a change area where the first image displayed on the display is to be changed based on the difference; and transmit the change information for the change area to the display.

16. The electronic device of claim 11, wherein the display comprises a display driver integrated-chip (DDI) and a display unit, and wherein the DDI is configured to:

receive the change information;

determine the second image based on the change information; and control the display unit to display the determined second image.

17. The electronic device of claim 11, wherein the sub-processor is configured to generate the change information by reducing a number of bits representing a color of each of pixels corresponding to a change area where the first image displayed on the display in the electronic device is to be changed based on the difference.

18. The electronic device of claim 17, wherein the number of bits is reduced from 24 bits to 1-bit.

19. The electronic device of claim 11, wherein a size of the second image data is smaller than a size of the first image data, and wherein the second image data is generated by the sub-processor without operating the main processor.

20. The electronic device of claim 11, wherein the change information comprises at least one subframe;

wherein the subframe is identified among a plurality of subframes based on the difference between the first image data and the second image data.

\* \* \* \* \*